Aug. 1, 1961 J. W. SINDEN ET AL 2,994,160
METHOD OF AND APPARATUS FOR SPAWNING CHAMPIGNON
SUBSTRATUM WITH CHAMPIGNON MYCELIUM
Filed June 30, 1958 2 Sheets-Sheet 1
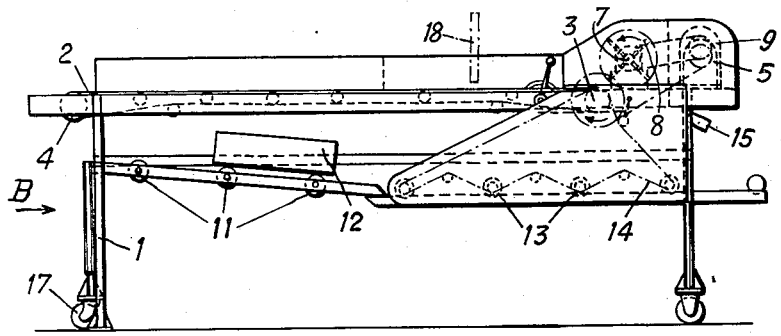
Fig. 1
Fig. 2
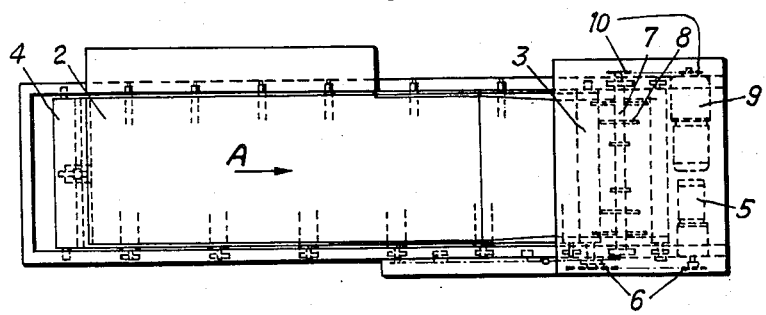
Fig. 3
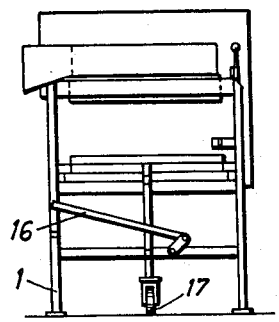
INVENTORS:
James W. Sinden
and
Ulrich Hauser
BY
Patent Agent United States Patent Office 2,994,160
Patented Aug. 1, 1961

2,994,160
METHOD OF AND APPARATUS FOR SPAWNING CHAMPIGNON SUBSTRATUM WITH CHAMPIGNON MYCELIUM
James W. Sinden, Gossau-Zurich, and Ulrich Hauser, Meilen-Zurich, Switzerland, assignors to Hauser Champignonkulturen A.G., Gossau-Zurich, Switzerland, a company of Switzerland
Filed June 30, 1958, Ser. No. 745,667
Claims priority, application Switzerland Oct. 14, 1957
10 Claims. (Cl. 47—1.1)

The present invention relates to a method of and apparatus for spawning champignon substratum with champignon mycelium.

Heretofore, the spawning of champignon substratum with mycelium has been performed by inserting the mycelium by hand either in individual portions from 0.8 to 1.2 inches below the surface in the substratum, the spacing of the various spawning points being variable, or by spreading the mycelium by hand over the surface of the manure or fertilizer. These known methods have the following drawbacks:

In the first place, the mycelium grows but slowly through the manure or fertilizer and often unevenly so that the bed will be grown after two to three weeks only.

In the second place, the mycelium lying on the surface is subject to the attack of fungus and animal pests such as insects and is also subject to drying out.

The above mentioned spawning process is slow and expensive due to the amount of manual labor involved.

It is, therefore, an object of the present invention to provide a method of and apparatus for spawning champignon substratum which will overcome the above mentioned drawbacks.

It is another object of this invention to provide a method of spawning champignon substratum which can be carried out by an apparatus.

A further object of this invention consists in the provision of an apparatus for spawning champignon substratum, which is relatively cheap in construction and simple to operate.

These and other objects and advantages of the invention will appear more clearly from the following specification in connection with the accompanying drawing, in which:

FIG. 1 illustrates a side view of an apparatus according to the present invention for spawning champignon substratum.

FIG. 2 is a top view of the apparatus shown in FIG. 1.

FIG. 3 is an end view of the apparatus of FIG. 1 seen in the direction of the arrow B.

Figure 4:
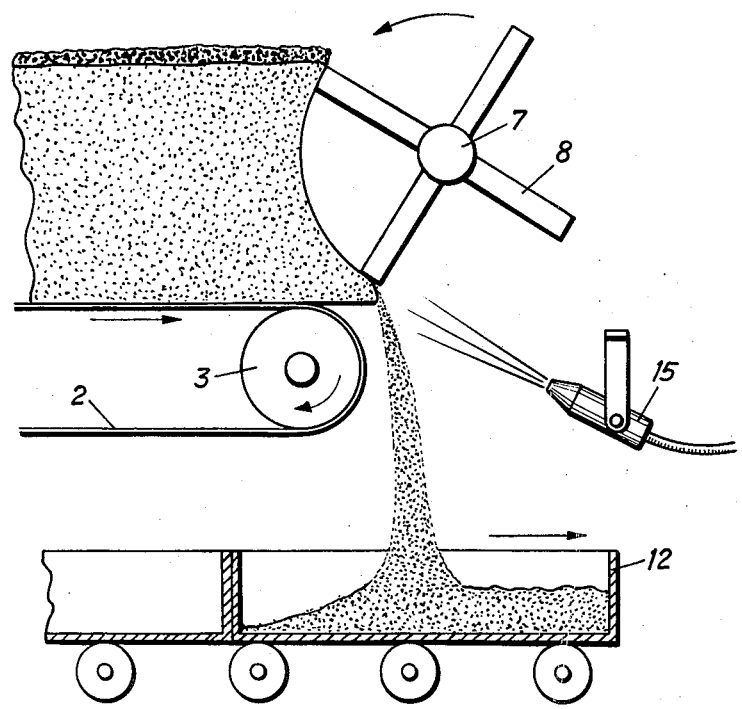
FIG. 4 is a side view of the mixing, humidifying and transporting devices of FIG. 2 on a larger scale.

The method according to the present invention is characterized primarily in that the mycelium is intermixed with the substratum to be spawned.

The apparatus for carrying out the method according to the invention is characterized primarily in that it comprises an endless belt driven in a continuous manner by a motor and having mounted thereabove a rotating mixing device, while below said belt there is arranged a conveying device parallel to said belt and moving in the same direction as the latter. The said conveying device is adapted to convey containers into which the intermixed substance can drop in a continuous manner.

Referring now to the drawing in detail, the apparatus illustrated therein comprises a frame with four legs 1. This frame supports an endless belt 2 which may consist, for instance of textile fabric, rubber, synthetic material or wire mesh. The belt 2 travels around the two end pulleys 3, 4. The end pulley 3 is adapted to be driven in a continuous manner by an electric motor 5 through the intervention of a chain and sprocket wheels 6. Arranged above the end pulley 3 is a mixing device comprising a shaft 7 with radially projecting fingers 8. Shaft 7 is driven by an electric motor 9 through the intervention of sprocket wheels 10. The transmission ratio is so selected that shaft 7 roates at a speed of from 100 to 160 r.p.m., preferably at 140 r.p.m.

Arranged below the belt 2 is a plurality of parallel freely rotatable rollers 11 arranged in such a way that the distance of said rollers from the floor decreases in the direction toward the mixing device. Thus, the containers 12 which may be in form of boxes will, due to their own weight, travel toward the center of the apparatus. The containers 12 may be made of wood or any other suitable material. Rollers 13 arranged subsequently to the rollers 11 are adapted to be driven by an electric motor 5 through the intervention of a chain 14 common thereto, while the drive is expediently effected via the end pulley 3.

Arranged below the mixing device is an adjustable humidifying device 15 which comprises one or more nozzles for atomizing water so that the substratum may be humidified whenever necessary.

In order to simplify the transport of the apparatus and in order to be able to mount the apparatus wherever desired, at least one roller 17 is provided which is adjustable as to height by means of a lever 16.

The champignon subtratum, which preferably consists of horse manure or commercial fertilizer, is filled into containers such as boxes. These boxes complete with contents are usually pasteurized whereby the substratum will be more or less packed. For purposes of spawning, the contents of said boxes are poured onto belt 2, the empty boxes 12 are then placed upon the rollers 11 on which due to the drop or incline toward the center, the empty boxes 12 will roll toward the center of the apparatus or until they engage the preceding box. The material from said boxes is then by means of the slowly moving belt 2 moved in the direction of the arrow A toward the mixing device. Prior to this material being caught by the fingers 8, mycelium is sprinkled upon said material so that said mycelium will be intimately intermixed with the substratum during the mixing operaton. Usually, rye grains are employed as carrier for the mycelium. Depending on the respective humidity content of the substratum, the latter may, prior to its dropping into the boxes 12, be moistened by water atomized by the atomizing device 15. Due to the fact that the boxes are conveyed in a continuous succession, the substratum is filled into said boxes in such a way that a uniform layer thickness will be obtained therein, which is subsequently compressed by a press to the volume the material had prior to being intermixed.

After spawning, the mycelium starts to grow through the substratum in the boxes. After a number of days, i.e. when the substratum is completely grown through or interwoven by the mycelium, while the hyphae are still very fine and have not yet thickened into rhizomorphs, the substratum must be cased or covered by a layer of soil or sand.

The apparatus according to the present invention may also be employed for casing or covering. To this end, the mixing device is disconnected, and a stripper blade 18 is arranged at a suitable height across the full width of belt 2. Covering material in form of soil or sand is then poured onto the continuously moving belt 2. The thus deposited cover material is then distributed and smoothened out by blade 18 so that after the material has passed below the said blade, a layer of uniform thickness will be obtained which will then drop into the continuously succeeding boxes comprising the substratum penetrated by the spawn. In this way, the thickness of the layer applied will be very uniform regardless of any small humps or depressions present in the surface of the substratum so that also here favorable conditions will be created for a uniform harvest.

The new method according to the invention namely the uniform intermixing of the mycelium with the substratum by a mechanical mixing device offers the following advantages:

(a) Mixing of the mycelium shortens the time period between spawning and covering.

(b) Mixing of the mycelium results in an earlier start of the harvest.

(c) With increasing quantities of mycelium employed per unit area, the time periods for (a) and (b) supra may be shortened to a considerably greater extent than by the methods heretofore known.

(d) The intermixing of the mycelium and manure or fertilizer increases the total yield.

In verification of the above outlined advantages, the following tests have been carried out:

A substantial number of boxes each having an area of approximately 5 square feet and a substratum thickness of approximately 6 inches were spawned in the following variations:

(I) By distributing the mycelium in the substratum by means of the device according to the invention (hereinafter referred to as test series A);

(II) By scattering the mycelium over the surface of the substratum according to the conventional method (hereinafter referred to as test series B).

Various quantities of spawn were employed in both series, i.e. 800, 400, 200, 100, 50 and 30 grams respectively. These quantities are within the limits of the common variations, 50 to 200 grams being most commonly employed, while approximately 800 grams constitute the maximum. The following mycelium was employed for spawning: Sinden, Process Grain Spawn. All boxes were spawned at the same time, however, in conformity with the above mentioned criterion for covering, the said boxes were covered at different times, provided with a cover layer, for instance of soil, sand or peat.

The following data were obtained:

TABLE I

| Quantity of spawn | Number of Days | | Difference between A and B | Reduction in terms of days owing to the increasing spawn quantity as compared with 30 grams | |
|---|---|---|---|---|---|
| | A | B | | A | B |
| Time Period ---- { 800 | 8 | 15 | 7 | 14 | 7 |
| 400 | 8 | 14 | 6 | 14 | [1] 8 |
| Spawning ------ { 200 | 10 | 19 | [1] 9 | 12 | 3 |
| 100 | 12 | 19 | 7 | 10 | 3 |
| Covering ------ { 50 | 19 | 22 | 3 | 3 | 0 |
| 30 | 22 | 22 | | | |

[1] These figures must be considered as chance variations.

TABLE II

| Quantity of spawn | Number of Days | | Difference between A and B | Reduction in terms of days owing to the increasing spawn quantity as compared with 30 grams | |
|---|---|---|---|---|---|
| | A | B | | A | B |
| Time Period ---- { 800 | 28 | 33 | 5 | 14 | 9 |
| 400 | 28 | 34 | 6 | 14 | 8 |
| Spawning ------ { 200 | 29 | 36 | 7 | 13 | 6 |
| 100 | 34 | 37 | 3 | 8 | 5 |
| Harvest ------- { 50 | 27 | 42 | 5 | 5 | 0 |
| 30 | 42 | 42 | | | |

TABLE III

| | Quantity of spawn | A (grams) | B (grams) |
|---|---|---|---|
| Yield within 44 days after first spawning | 800 | 3,255 | 2,529 |
| | 400 | 3,189 | 2,352 |
| | 200 | 2,387 | 1,569 |
| | 100 | 1,796 | 1,654 |
| | 50 | 1,282 | [1] 1,234 |
| | 30 | [1] 180 | [1] 424 |

[1] These figures must be considered as chance variations.

TABLE IV

| | Spawn quantity, 100 grams | |
|---|---|---|
| | A | B |
| Total yield over a 50 day harvest period | 4,548 | 3,475 |

The results of the test series are represented in the following Tables I to IV:

*Table I*

This table refers to the number of days elapsed between spawning and covering.

Mixing the spawn by means of the spawning apparatus set forth above shortens the period between spawning and covering by three to seven days as compared to scattering, for all quantities employed except for 30 grams, which deviation or variation is a result of the natural variation in such test series and may be regarded as a particularly small quantity of spawn. The increase in the quantity of spawn causes a reduction of from three to fourteen days when mixing. When scattering, only a reduction of zero to seven days is obtained. The shortening effect brought about by the increase in the quantity of spawn is larger by from three to nine days when mixing than when scattering the mycelium. This period of time is particularly critical because the non-covered substratum with the growing mycelium is subject to infection by foreign fungus, bacteria, insects etc. which all reduce the yield substantially.

*Table II*

This table refers to the number of days elapsing between spawning and harvesting.

The influence of the method of spawning and the quantity of spawn upon the time period elapsing between spawning and harvesting is the same as upon the time period elapsing between spawning and covering. This so-called unproductive time period between spawning and harvesting during which the conditioned rooms are taken up by the boxes without producing a yield, can be shortened by the method according to the present invention. The turnover in these rooms increases whereby the annual yield of a conditioned room of a given size will be favorably influenced which considerably influences the production costs.

*Table III*

This table shows the weight in grams of the harvested champignons which were picked sixteen days after the beginning of the harvest from the most advanced box of the test series. According to the more extended harvesting period, the yield in series A is greater for all quantities of spawn except for 30 grams (chance variation) than in series B. At the same time, the influence of the increase in the quantities of spawn is greater in series A. Practically, this means that it is possible by means of the method according to the invention and by suitable dosage of the quantity of spawn, to achieve that the yield after forty-four days counted from the date of spawning amounts to as much as two-thirds of the total harvest, whereas with the heretofore known method of scattering mycelium and with the heretofore customary quantity of 50 grams of mycelium, after the said time period of forty-four days the harvest can only just be started.

*Table IV*

This table shows the total yield of champignons over a fifty day harvest period of a further test series in which approximately 100 grams of spawn were used. In the test series A, an excess yield of approximately 2¼ pounds was obtained per 5 square feet as compared to that of the test series B. The increase in the yield by the method according to the present invention thus amounts to approximately 30%.

It is, of course, to be understood that the present invention is, by no means, limited to the particular method and test series described nor to the specific apparatus set forth in the drawing but also comprises any modifications within the scope of the appended claims.

What we claim is:

1. An apparatus for spawning champignon substratum with champignon mycelium, which comprises in combination: a frame, a stationary mixing device supported by said frame and adapted to intermix champignon substratum and campignon mycelium, means for discharging substratum intermixed with mycelium from said mixing device, first conveying means supported by said frame for conveying said champignon substratum to said mixing device, second conveying means arranged at a level lower than the level of said first conveying means and extending below said mixing device for conveying below said outlet, containers to be filled with intermixed champignon substratum and champignon mycelium to be discharged from said mixing device, said second conveying means comprising a first section and a second section with said first section designed as a roller conveyor descending from a level higher than the level of said second section toward the latter whereby containers can slide down from said first section onto said second section, and motor means for driving said second section of said second conveying means.

2. An apparatus for spawning champignon substratum with champignon mycelium, which comprises in combination: a frame, a stationary mixing device supported by said frame and including a rotatable mixer unit, means for discharging substratum intermixed with mycelium from said mixing device, first motor means drivingly connected to said rotatable mixer unit for driving the same, first conveying means supported by said frame for conveying said champignon substratum to said mixing device, second conveying means arranged below said first conveying means and extending below said mixing device for conveying containers to be filled with intermixed champignon substratum and champignon mycelium discharged from said mixing device, and second motor means independent of said first motor means for positively driving a portion of said second conveying means.

3. An apparatus for spawning champignon substratum with champignon mycelium, which comprises in combination: a frame, a stationary mixing device supported by said frame and adapted to intermix champignon substratum and champignon mycelium, means for discharging substratum intermixed with mycelium from said mixing device, first conveying means supported by said frame for conveying said champignon substratum to said mixing device, second conveying means arranged at a level lower than the level of said first conveying means and extending below said outlet of said mixing device for conveying below said mixing device containers to be filled with intermixed substratum and champignon mycelium to be discharged from said mixing device, and driving means driving said first and second conveying means at substantially uniform speeds.

4. An apparatus for spawning champignon substratum with champignon mycelium, which comprises in combination: a frame, a stationary mixing device supported by said frame and adapted to intermix champignon substratum and champignon mycelium, means for discharging substratum intermixed with mycelium from said mixing device, first conveying means supported by said frame for conveying said champignon substratum to said mixing device, second conveying means arranged at a level lower than the level of said first conveying means and extending below said mixing device for conveying below said mixing device, containers to be filled with intermixed champignon substratum and champignon mycelium to be discharged from said mixing device, and driving means associated with said first and second conveying means and arranged to drive said second conveying means at a speed higher than said first conveying means.

5. A method of covering spawned champignon substratum with a uniform layer of covering material comprising: depositing spawned champignon substratum on a continuously operating conveyor means, pouring said covering material on a continuously moving belt above said conveyor means, passing said moving belt under a stripper blade at a distance therefrom sufficient to smooth and level the surface of said covering material, and render said surface uniform in thickness, and thereafter discharging said covering material on the substratum thereunder.

6. A method according to claim 5 wherein said covering material is selected from the group consisting of soil, sand and peat.

7. A method of depositing a uniform layer of covering material on spawned champignon substratum comprising: continuously depositing said covering material on a moving belt, introducing successive batches of spawned champignon substratum at an entrance point below said moving belt, passing said moving belt under a stripper blade at a distance therefrom sufficient to smooth and level the surface of said covering material and form a substantially uniform layer of said covering material on said moving belt, advancing said successive batches of spawned champignon substratum below and in the direction of movement of said moving belt, discharging said covering material from said moving belt at a predetermined discharge point, passing said batches of spawned champignon substratum below said discharge point, whereby said covering material is deposited in a substantially uniform layer on said batches of spawned champignon substratum.

8. A method according to claim 7 wherein said covering material is selected from the group consisting of soil, sand and peat.

9. An apparatus which comprises in combination: a frame, a horizontal conveyor belt in the frame, a mixing device supported by said frame adjacent the end of said conveyor belt and above the conveyor belt and comprising a member rotatable on a horizontal axis and radial fingers projecting therefrom, conveying means arranged at a lower level than the level of said first conveying means and extending below said mixing device, said second conveying means comprising an inclined first section and a horizontal second section with said first section comprising freely rotatable rollers arranged in a path descending from a level higher than the level of said second section toward the latter, said second section comprising rollers, and motor means drivingly connected with said rollers of said second section.

10. An apparatus which comprises in combination: a frame, a stripper blade supported by said frame, horizontal moving belt means arranged below said stripper blade, said belt means being adapted to convey bulk material beneath said stripper blade to be smoothed out thereby to a uniform layer, said belt conveyor having a terminal end forming a point of gravity discharge of material therefrom, conveying means arranged at a lower level than the level of said moving belt means, said conveying means comprising a first section and a second section with said first section designed as a roller conveyor descending from a level higher than the level of said second section toward the latter, motor means for driving said second section of said second conveying means, and said second section extending under said discharge point of said belt means to receive therefrom the said material in uniformly distributed relation.

References Cited in the file of this patent

UNITED STATES PATENTS

| | | |
|---|---|---|
| 1,773,648 | Steves | Aug. 19, 1930 |
| 2,034,678 | Knaust | Mar. 17, 1936 |
| 2,060,223 | Lambert | Nov. 10, 1936 |
| 2,097,766 | Knaust | Nov. 2, 1937 |
| 2,151,894 | Cambessedes | Mar. 28, 1939 |
| 2,675,591 | Tavernetti | Apr. 20, 1954 |
| 2,723,493 | Stoller | Nov. 15, 1955 |

FOREIGN PATENTS

| | | |
|---|---|---|
| 351,314 | France | May 3, 1905 |
| 1,060,737 | France | Nov. 18, 1953 |